2,978,370

COMBINED FLUXING, CLEANING, AND TINNING DEVICE AND COMPOSITION, AND METHOD OF MAKING THE SAME

James R. Mulholland, University Heights, Ohio, assignor to Lonnie Gary, Cleveland, Ohio, as trustee No Drawing. Filed Oct. 16, 1958, Ser. No. 767,514

6 Claims. (Cl. 148—24)

This invention relates to a combined fluxing, cleaning, and tinning device for tinning metal surfaces preparatory to the application of solder and like materials thereto, to a method of making the device, and to a method of preparing the fluxing, cleaning, and tinning composition thereof.

In the preparation of metal surfaces for the application of solder, either for filling scratches and other cavities or for soldering two pieces of metal together, it is desirable that the surface be clean, etched, and tinned, preparatory to the application of the molten solder.

For the purposes of illustration, the invention is described herein as applied to the repair of automobile bodies, for which it is particularly desirable, its application to other operations being readily apparent from the illustrative example.

In the repair of automobile bodies, many surfaces of the automobile body which are to be filled with solder, for subsequent grinding and filling to restore the original contour of the surface, are disposed vertically or at angles such that any flowable material applied thereto quickly drains off. Thus, fluxing, cleaning, and tinning are quite difficult.

Furthermore, the metal of automobile bodies is quite thin and heating of the metal to a high temperature during or preparatory to tinning, so as to prepare it for the final soldering operation, is apt to deleteriously affect the metal, deteriorate its quality, and actually burn and destroy it. Furthermore, in such repair work, the metal surface is first ground to remove oxides, paints and other overcoatings and the like, so that a clean unoxidized surface is presented for tinning and solder filling. However, the fluxing, cleaning, and tinning operations must follow the grinding operation promptly and be carried to completion expeditiously so that the surface is maintained free from oxide.

In accordance with the present invention, a combined fluxing, cleaning, and tinning device in which is incorporated a combined fluxing, cleaning, and tinning composition, is wiped over the ground, unheated metal surface and thereby the surface is cleaned, fluxed, and has deposited on it a tinning composition which, upon heating of the surface to a low soldering temperature, for example, about 350° F., becomes tinned so that it can readily receive the molten solder which is to be used as a filler. The solder is melted at low temperatures around 350° F., and is applied in molten state directly to the unheated surface thus tinned, without any further preparation or preheating of the surface except as incidental to the loss of heat by the solder.

The present invention resides not only in the device, but also in the method of making the device and the composition which is incorporated as a part of the device.

The present invention is applicable to all metals, except aluminum, and is applied to the ground surface of the metal simply by wiping of the device, impregnated with the composition, over the ground surface.

The composition comprises essentially a flux, a cleaner, and a tinner.

The flux preferably comprises essentially an aqueous solution of zinc chloride and ammonium chloride in the preferred ratio, by weight, of about twenty-seven percent zinc chloride, eleven percent ammonium chloride, and about sixty-two percent water. The range, by weight, of the zinc chloride may be from about twenty to forty percent, and of ammonium chloride from about seven to sixteen percent, the balance being water.

The ammonium chloride tends to stabilize the zinc chloride so that it will not be damaging to the hands of the operator when in an aqueous bath or solution. The proportions of the zinc chloride and ammonium chloride and water preferably are such that the resulting solution has a pH of about seven.

The tinning composition comprises, by weight essentially tin and lead, each in powdered form with particle sizes preferably not less than 200 mesh. The tin and lead in the tinning composition preferably are in a ratio, by weight, of about fifty percent tin and fifty percent lead, although they may be varied, depending on the use to which the material is to be put, to a ratio, by weight, of about twenty-five to seventy-five percent tin to seventy-five to twenty-five percent lead.

The flux and tinner are mixed together in the ratio, by weight, preferably of about one part of flux solution to one and one-quarter parts of tinner, though the ratio may range from about one part of flux solution to from about one-half to two parts of tinner.

The cleaner preferably is one of the detergent alcohols, for example, octyl alcohol or the so-called milk sugar. Any of the water soluble highly detergent alcohols, in liquid or powder form, and preferably those which in the ratio used are not deleterious to the skin, may be used.

The amount of cleaner is, by weight, equal to about two percent of the weight of the flux solution. It may be added to the flux solution at any time, but preferably during the original mixture thereof and prior to addition of the lead and tin.

The applicator preferably comprises a synthetic sponge which is not adversely affected by the composition. One suitable sponge is one which is commonly marketed for general household purposes under the name "Nylonge." The sponge is essentially a nitrocellulose and nylon sponge formed from a plasticized mixture of nitrocellulose reinforced by nylon.

A sponge about four inches long by two inches wide, by one-half inch thick is satisfactory and efficient. It is penetrated from each face by the tinner to a depth of about one-sixteenth of an inch or more.

The sponge may be impregnated with the combined flux, cleaner, and tinner in a number of ways. For example, it may be dipped in a slurry of the three and caused to absorb to its full capacity thereof, after which it is put through sets of graduated wringers, with throats decrescent in the direction of travel of the sponge therethrough. For this purpose, it is generally best that the two rolls of each set be power driven, as otherwise there is a tendency to wring out the one side of the sponge to a greater degree than the other, whereas it is desirable that both sides be wrung out to the same degree. Furthermore, or order to effect good distribution and uniformity of product it is better that a plurality of wringers be used rather than an attempt be made to press out all of the excess slurry with one wringing operation.

In this connection, it must be noted that the manner of preparing the slurry is important. First the fluxing, or fluxing and cleaning, solution is prepared, after which the tin and lead, either mixed or separately in any order, are added and the resultant composition stirred thoroughly. If an attempt is made to mix the zinc chloride, ammonium chloride, the tinning metals, and the water concurrently and initially, a temperature of reaction of about 300° F. develops, driving off the water, and ruining the sponge. This reaction continues until a hard, solid mass, which cannot be reconverted into the slurry, remains.

A second way of preparing the device is to wet the synthetic sponge by dipping it in the fluxing and cleaning solution, squeezing out any excess of the solution, and then placing the sponge into a container in which it is immersed in a cloud of the dry tinning composition which, due to the moisture in the sponge, adheres to and fills the surface voids and cavities of the sponge. The ratio of solution to tinning composition is about the same as by the slurry method.

These specific manners of incorporating the materials in the sponge have distinct advantages. However, other manners of so incorporating the materials may be used, if desired.

The following is a specific example of the device which is very time saving and economical in body repair work where cost is a controlling factor.

A synthetic fine pore sponge of nitrocellulose and nylon composition of 4 inches x 2⅛ inches x ½ inch, and weighing about three-quarters of an ounce is impregnated with about one ounce of the above mentioned preferred flux solution, a cleaner, and about one and one-half ounces of the above mentioned preferred tinning composition. Such a device is capable of cleaning, fluxing, and tinning about thirty square feet of finish ground metal surface. A single firm wipe over an area completes all three operations, so that the surface can be cleaned, fluxed, and tinned in a very short time. Furthermore, the applied materials remain in situ as applied, there being no flowing and draining off of the compositions.

In use, the surface to be soldered or filled is merely wiped while unheated with the impregnated sponge and this cleans, fluxes, and prepares the surface so that, by heating the surface to about 350° F., the surface becomes coated with the tinning coat and is ready, in unheated or only slightly heated condition, for the reception of the solder at the moderately low melting temperature of the solder of 350° F., as mentioned.

The solder may be applied in any of the usual manners in which it is applied for such purposes after the surface is prepared, the present invention relating not to the soldering itself nor to the purpose of the soldering, but to the manner of preparing the surface for receiving solder. If, upon initial heating, the surface is not fully tinned, the bare spots may be wiped again very quickly with the device whereupon the residual heat causes tinning of the bare spots. If not, a slight amount of low heat may again be applied to the newly wiped area.

The initial heating should always follow promptly the wiping operation so that the surface does not oxidize before tinning is completed. The surface is cleaned, fluxed, and tinned without etching, and a firm band of the tinning coat is obtained.

Having thus described my invention, I claim:

1. A combined fluxing, cleaning and tinning device comprising a synthetic sponge impregnated with an aqueous flux solution, a tinning composition, and a cleaning composition, the aqueous flux solution consisting, by weight, essentially of:

Zinc chloride—about 20% to 40%
Ammonium chloride—about 7% to 16%
Balance—water;

the tinning composition consisting essentially of a mixture of powdered tin and powdered lead, substantially all of a fineness of approximately 200 mesh or finer, in the ratio, by weight, of:

Tin—25 to 75%
Lead—75 to 25% the cleaning composition consisting of a water soluble wetting agent, in the amount, by weight, of a very small percentage of the flux solution; and the flux solution and tinning composition being in the ratio, by weight, of about one part of flux solution to one and one half to two parts of the tinning composition.

2. The device according to claim 1 wherein in the flux solution the zinc chloride is about 27% and the ammonium chloride is about 11%, by weight.

3. The device according to claim 1 wherein the wetting agent is a water soluble detergent alcohol.

4. The device according to claim 1 wherein, in the tinning composition, the lead is about 50% and the tin is about 50%, by weight.

5. The device according to claim 1 wherein, in the aqueous flux solution, the proportion of ammonium chloride is sufficient relative to the proportion of zinc chloride and water to reduce the acidity of the solution to about pH 7.

6. The device according to claim 1 wherein the percent of wetting agent is, by weight, from about 1% to 3% of the flux solution.

References Cited in the file of this patent

UNITED STATES PATENTS

| | | |
|---|---|---|
| 1,004,847 | Brach | Oct. 3, 1911 |
| 2,033,102 | Berry | Mar. 3, 1936 |
| 2,216,928 | Wilson | Oct. 8, 1940 |
| 2,508,501 | Giulio | May 23, 1950 |
| 2,806,808 | Siegfried | Sept. 17, 1957 |